July 21, 1959

R. J. BRASKI 2,895,547

FOOD MIXER TIMER

Original Filed Oct. 11, 1950

Inventor:
Raymond J. Braski
By: Watson D. Harbaugh
Atty.

July 21, 1959          R. J. BRASKI          2,895,547
FOOD MIXER TIMER
Original Filed Oct. 11, 1950          2 Sheets-Sheet 2
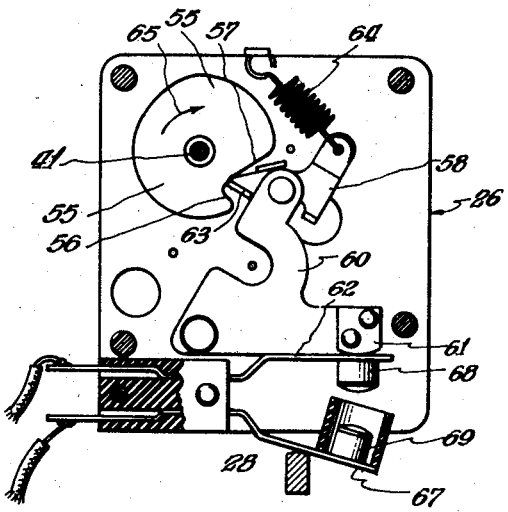
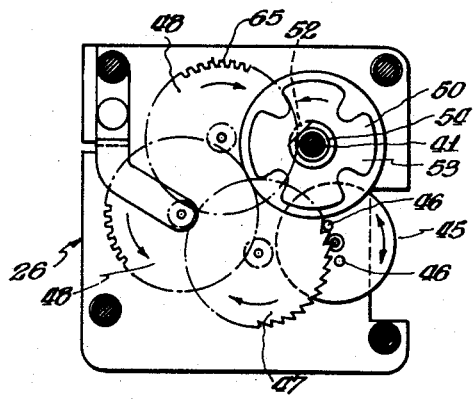
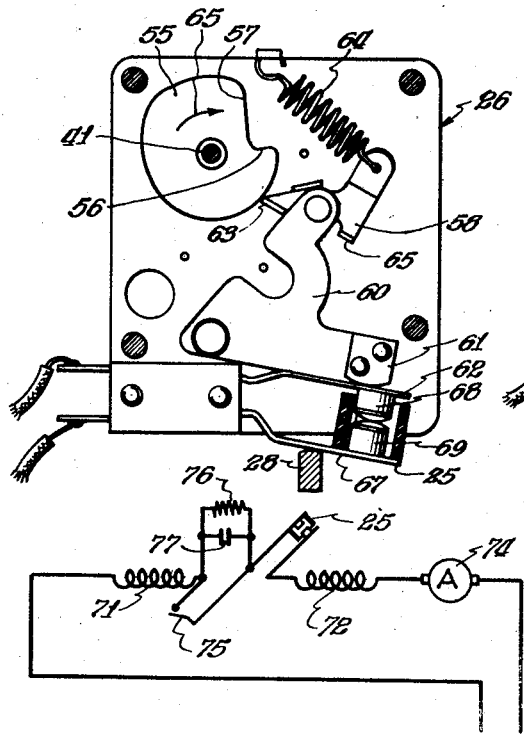
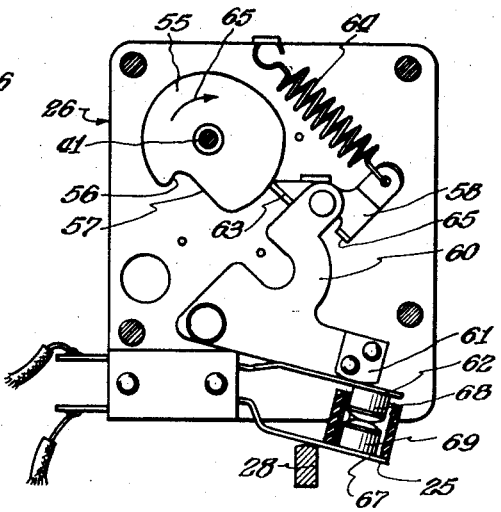

United States Patent Office 2,895,547
Patented July 21, 1959

2,895,547
FOOD MIXER TIMER

Raymond J. Braski, Chicago, Ill., assignor to Dormeyer Corporation, Chicago, Ill., a corporation of Illinois Original application October 11, 1950, Serial No. 189,651, now Patent No. 2,671,191, dated March 2, 1954. Divided and this application July 29, 1953, Serial No. 371,098

5 Claims. (Cl. 161—1)

This invention relates generally to food mixers and more particularly to an improved electrically driven food mixer having a novel mixing speed and timer control arrangement. This application is a division of my application Serial No. 189,651, filed October 11, 1950, now Patent No. 2,671,191.

Cooking recipes frequently specify that a batch be mixed in a food mixer operated at a predetermined speed for a predetermined length of time. Where recipes do not so provide, experienced cooks often desire to mix batches for predetermined periods which experience has taught them give the best results. Accordingly, an important object of this invention is to provide an electrical food mixer having both a speed control governor and a built-in timer mechanism permitting the mixer to be operated at a predetermined speed for a predetermined length of time and eliminating the need for the operator's standing by the mixer during the entire operation.

Another object is to provide a food mixer having a mechanical timer which mixer may be manually controlled to operate at a predetermined speed independently of the timer mechanism when desired.

Another object is to provide an economical, compact arrangement wherein certain parts serve dual functions in both the time and speed control apparatus in order to reduce the number of parts in the assembly making it more compact and economical to manufacture.

Another object is to provide an arrangement wherein a minimum of manual adjustments are required to change the mixer from manual adjustments to time controlled operation and vice versa.

A further object is to provide a compact arrangement of the various control elements within the mixer shell and have the speed and time control dials or knobs conveniently positioned adjacent to one another on the same side of the mixer so that both are clearly visible and accessible to the operator at the same time.

Other objects and advantages of this invention will of course present themselves to those familiar with the art upon reading the following specification in conjunction with the drawings and the appended claims.

In the drawings:

Fig. 3 is a vertical section taken on line 3—3 of Fig. 2, the parts being shown in the positions they occupy when both the speed control and the timer control are set in the "off" position;

Fig. 4 is a vertical section taken on line 4—4 of Fig. 2;

Fig. 5 is a view similar to Fig. 3, the parts being shown in the positions they occupy when the timer mechanism is operating and controlling the mixer;

Fig. 6 is a view similar to Fig. 3, the parts being shown in the positions they occupy when the timer control is set for manual time control; and Fig. 7 is a schematic view of a preferred electrical circuit.

Figure 1:
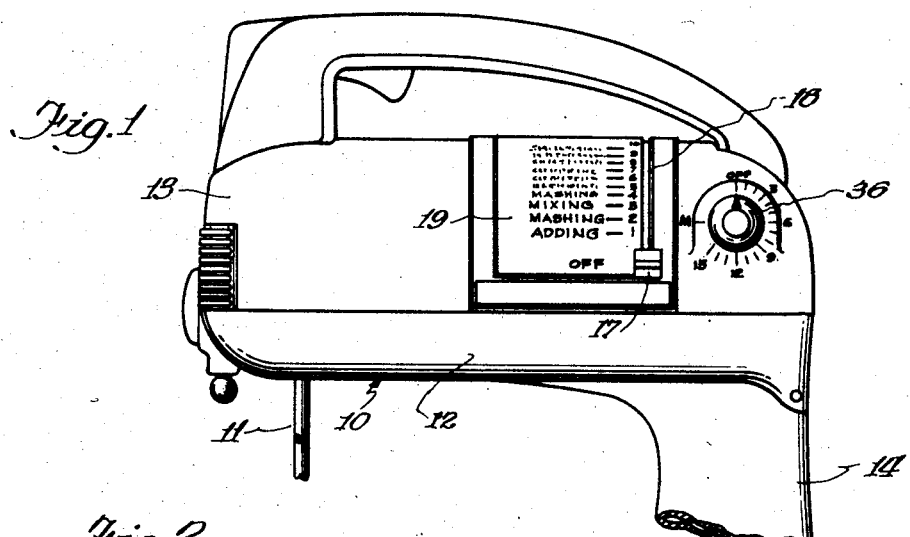
Fig. 1 is a side view of the power unit portion of a household food mixer constructed in accordance with this invention.

The power unit 10 shown in Fig. 1 contains a conventional electric motor and gear box for driving a pair of spaced interdigitating beaters whose shafts are indicated at 11. The working elements of the power unit are enclosed in a two-piece casing 12 and 13. The lower portion of the casing is preferably die cast and supports the motor bearings and windings (not shown) as well as the various elements of the control mechanism. In Fig. 1 the mixer is shown as pivotally supported on a pedestal element 14 which is attached to a bowl supporting base (not shown).

Figure 2:
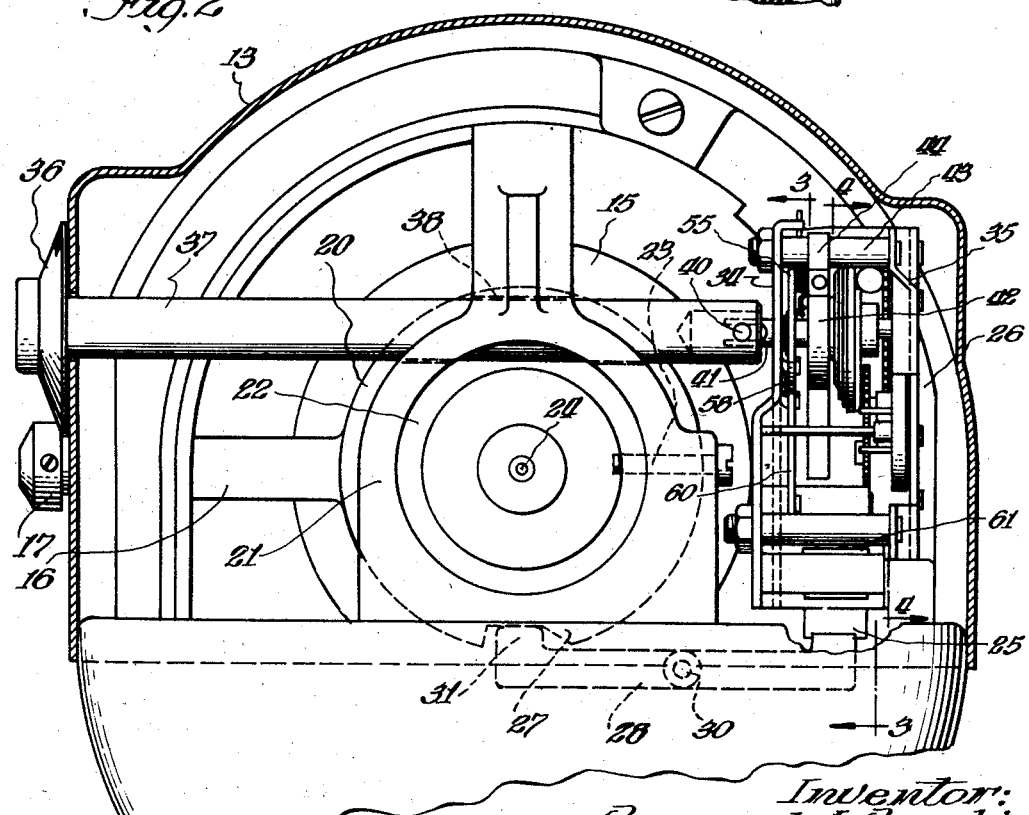
Fig. 2 is a greatly enlarged vertical section of the rear end of the power unit showing the arrangement of the control elements.

At the rear end of the motor a centrifugal governor 15 (Fig. 2) is provided, the governor being attached to the end of the motor shaft so as to rotate therewith. The governor 15 is similar to that shown and described in U. S. Patent No. 2,612,571 to William F. Bisley for Power Unit and Governor for Household Food Mixers, reference to which is hereby made. A speed control lever 16 carrying a knob 17 projects through a slot 18 provided in the side wall of the mixer. The inner end of this lever is attached to a cam ring 20 journalled on a cylindrical boss 21 provided on the lower casing 12. The inner edge of the ring 20 is keyed to a cup-shaped governor control element 22 which is journalled within the boss 21. A helical cut-out (not shown) is provided in the side of the element 22 and cooperates with a screw 23 to cause the element 22 to move forward as the arm 16 is rotated clockwise from the position shown in Fig. 2. The screw 24 located at the center of the cup-shaped element 22 carries a pressure element (not shown) on its inner end which presses against a movable element carried by the governor to, in turn, vary the speed setting thereof as the arm 16 is moved. The arm 16 is movable from the "off" position shown to one 90 degrees therefrom at which maximum speed mixing occurs.

The ring 20 serves an additional function as a cam ring for controlling the position of the main motor switch 25. The switch 25 is so arranged as to also be controlled by the timer mechanism indicated at 26. To actuate the switch 25 a cam surface 27 on the ring and an actuator lever 28 are provided. The lever 28 is pivoted upon a pin 30 supported in the lower casing 12. As will be apparent from an examination of Fig. 2, the moment the arm 16 is moved away from the "off" position illustrated, the ring 20 is rotated to force the cam follower 31 downwardly and move the switch 25 upwardly. The operation of the switch 25 will be described more fully in connection with the description of the timer mechanism which follows.

The timer mechanism 26 is supported by two vertical plates 34 and 35 which are mounted on the lower casing 12. The timer dial 36 is on the opposite side of the mixer from the mechanism 26 and is connected thereto by a shaft 37 which extends across the mixer through an opening 38 provided in the boss 21. One end of the shaft 37 is rigidly connected to the dial 36 and the other end is keyed by a pin 40 to a smaller diameter shaft 41 which projects through the side of the timer mechanism 26. Thus the setting of the timer dial 36 is transmitted to the mechanism 26. This arrangement is particularly advantageous in that it permits the speed control lever 16 and timer dial 36 to be located side by side where both are visible and accessible at the same time.

The construction and operation of the mechanism 26 can be most easily understood by reference to Figs. 2-6 in which like parts are identified by like numbers. The timer 26 comprises an escapement mechanism, best shown in Fig. 4, a cam and switch actuating mechanism, shown in Fig. 3, and a spiral drive spring 42 shown in Fig. 2. The drive spring 42 is attached at its center to the shaft 41, and the outer end of this spring is attached to a fixed cross member 43 by a clip 44. On assembly the spring 42 is tensioned slightly so that at all times it tends to rotate the shaft 41 in the clockwise direction as viewed in Fig. 3.

The escapement mechanism comprises a balance wheel 45, having a pair of anvils 46 thereon which regulate with an escapement wheel 47, and a train of gears 48 for driving the escapement wheel 47. A friction clutch 50 connects the first gear of the train 48 to the shaft 41. The clutch 50 comprises a circular plate 51 which is loosely journalled on the shaft 41 and a clover-leaf pressure spring 53. The plate 51 is attached to the end pinion 52 of the train 48. The clover-leaf spring 53 is mounted on the front side of the plate 51 so that its periphery bears against the plate 51. The center portion of the spring 53 is fixed to an element 54 pressed on the shaft 41. Thus the spring 53 rotates with the shaft 41 and transmits motion of the shaft to the plate 51 by friction. The pressure of the spring 53 is adjusted so that the milder return force of the spiral spring 42 is transmitted to the escapement, while the greater winding force employed to turn the dial 36 to set the timer is not transmitted but instead results in a slipping of the clutch. The clutch action of the spring 53, therefore, protects the escapement mechanism from damage when the dial 36 is set. Thus the dial 36 may be turned to any desired setting independently of the escapement mechanism, and when the dial 36 is turned in the clockwise direction, Fig. 1, to any time setting and released, the action of the spring 42 and the escapement mechanism causes the shaft 41 to rotate slowly counter-clockwise to the "off" or zero position timing the mixing operation in accordance with the angle of travel.

The switch 25 is operated by a cam plate 55 (Fig. 3) carried by the shaft 41. This plate, which is substantially circular, is relieved as shown in the drawings to provide a sharp step 56 and an involute surface 57. The purpose of the sharp step 56 is to provide a quick action when the timer reaches zero, so that the switch 25 will open rapidly.

The cam follower assembly comprises a pawl 58, a pivoted actuator arm 60 on which the pawl 58 is mounted and a coil spring 64. An insulated lug 61 is mounted on the other end of the arm and engages the upper leaf element 62 of the switch 25. The pawl 58 is pivoted to permit the follower surface 63 to pass over the step 56 when the shaft 41 is counter-clockwise from the "off" position, shown in Figs. 1 and 3, to a "run" position, shown in Fig. 5. As the cam 55 is turned in a counter-clockwise direction (as shown in Fig. 3) from the "off" position, the follower surface 63 is engaged by the step 56. As the cam 55 continues to turn, the pawl 58 is rotated in a clockwise direction about pivot 59 stretching the arm 60. When this point is reached the follower surface 63 is so slanted with respect to the step 56 that it rides up the step readily rocking arm 60 about pivot 59 as the cam 55 continues to turn. When the follower surface 63 reaches the top of the step 56 the spring 64 pulls the pawl 58 counter-clockwise about pivot 59 to the position shown in Fig. 5, the edge of the surface 63 serving as a limit stop for the pawl 58.

When the knob 36 has been turned as described above and is released, the spring 42 which has been tensioned by the rotation of the shaft 41 causes the shaft 41 to rotate in the direction indicated by the arrows 65, the escapement mechanism limiting the speed of rotation to time the mixing operation. When the preset time has expired and the cam 55 has returned to such a position that the follower surface 63 coincides with the edge of the step 56, the spring 64 pulls the pawl 58 and the arm 60 counter-clockwise about pivot 59 to the position shown in Fig. 3. During the "running" portion of the cycle the pawl 58 remains in the position shown in Fig. 5 so that it drops suddenly off of the step 56 instead of sliding slowly down. This causes the switch 25 to snap open despite the slow motion of the cam 55.

When the switch 25 has opened, the cam 55 continues to rotate for a very short time until the follower surface 63 reaches the start of the incline 57. At this point the cam's motion is checked because greater force is required to move the pawl 58 outwardly than is available in the spring 42. However, the dial 36 may be readily turned counter-clockwise, Fig. 4, by hand to the manual control position indicated by the letter "M," the incline 57 carrying the pawl 58 outwardly. A stop (not shown) prevents travel of the dial 36 beyond the manual position in which the parts are as shown in Fig. 6. As illustrated in Fig. 6, the switch 25 is closed when the dial is set on "manual" if the speed control lever 16 has been moved to a speed setting.

The switch 25 comprises a block of insulating material 66 which supports two flexible contact members 62 and 67, each provided with a contact 68 and 69. The two members are shown in the unstressed position in Fig. 3 with the contacts 68 and 69 widely separated, both the speed control lever 16 and the dial 36 being rotated to the "off" position. When the lever 16 is moved upwardly the cam action of the ring 20 causes the end of the lever 28 beneath the switch 25 to be raised, flexing the lower flexible member 67 upwardly to the position shown in Fig. 5. The lower contact 69 is then in such a position that it may be engaged by the upper contact 68 when the cam 55 is turned in either direction from the "off" position, namely to the "manual" position shown in Fig. 6 or a "run" position shown in Fig. 5. However, if the lever 16 is not moved from its "off" position as described and the lower flexible member is not raised as described, the switch 25 cannot close.

In order to increase the life of the contacts 68 and 69 a fiber sleeve 70 is provided which serves to snuff out the arc formed as the contacts 68 and 69 separate. The quick opening of the contacts when the end of the time cycle is reached practically eliminates arcing at this phase of operation, but repeated slow movement of the speed control lever 16 to the "off" position may cause contact damage if the mixer is used with direct current and the sleeve 70 is not provided.

Thus the switch is open if either the speed setting lever 16 or the timer dial 36 is in the "off" position. This greatly simplifies the electrical circuit of the mixer (shown in Fig. 7) by eliminating the need for an extra switch. The control switch 25 is preferably connected between the two halves of the series motor field windings 71 and 72 in order to reduce radio interference from the switch to a minimum. The two field halves 71 and 72 are in series across the line 73 with the armature 74 and the centrifugal switch 75 of the governor 15. This latter switch is shunted by a resistor 76 and a condenser 77. The resistor 76 permits a reduced current to flow through the motor to decrease its speed when the centrifugal switch 75 is open, and the condenser serves to increase the life of the centrifugal switch and decrease radio interference from that source.

The operation of the mixer control mechanism is probably clear from the foregoing description of the various component parts, but the following résumé may prove helpful in fully understanding the invention.

Assuming that both the speed control lever 16 and the dial 36 are in the "off" position with the various elements as shown in Fig. 3, and that the operator desires to mix a batter for three minutes at a slow mixing speed, first the speed control lever 16 is moved upwardly until the knob 17 coincides with the proper speed indicated on the scale 19. Next the dial 36 is rotated in the clockwise direction until the index is opposite the numeral "3." These two operations may be made in reverse order if desired without affecting the operation of the mixer. As soon as both controls are set the switch 25 is closed and the escapement mechanism starts to run, the elements appearing as shown in Fig. 5. At the end of the three minute period the cam 55 has rotated back to the position of Fig. 3 allowing the pawl 58 to drop off of the step 56 to open the switch 25 and stop the motor, ending the mixing at the predetermined time.

Assume next that the operator merely desires to whip a batch of cream until it reaches a desired expanded condition and that the mixing speed for this operation is established. The length of time for such whipping cannot be known in advance for it depends on properties of the cream, such as its temperature, which are variable. Moreover, it is important that the cream not be whipped for too long a period. Under these conditions the manual control is preferably used. The operator merely sets the speed control lever to the indicated whipping speed and turns the timer dial 36 to the manual position indicated by the letter "M." The parts then are in the positions shown in Fig. 6 with the switch 25 closed. Since the spring 42 is not under tension tending to return the cam 55 to the "off" position, the escapement will not operate and the mixer will run until the switch 25 is manually opened by returning either of the controls to the "off" position when the operator notes that the cream has been properly whipped.

From the foregoing it will be apparent that a greatly improved mixer has been provided which is automatic in operation, simple to set and control and fulfills the objects of the invention.

Various changes and modifications such as will present themselves to those familiar with the art may be made without departing from the spirit of this invention.

I claim:

1. A timer comprising an escapement mechanism, a clock spring, an overload clutch, a drive shaft connected through said clutch to said mechanism, a cam driven by said shaft and manually rotatable in either direction from an "off" position, a switch actuator member, a cam follower cooperating with said cam and pivotally supported on the switch actuator member, stop means for limiting rotation of said follower with respect to said member, said cam having a relieved portion defining a step thereon and said follower rotating in one direction to ride up the step when the cam is turned in one direction, resilient means for urging said follower to rotate in the opposite direction after it has ridden up said step so that said cam slips suddenly off of said step when said cam is turned in the opposite direction and a switch closable by said switch actuator member when said cam follower is on either side of said relieved portion, said spring being adapted to impart torque to said shaft when said follower is on the side adjacent said step and to maintain said mechanism in inoperative condition when said follower is on the other side thereof.

2. A timer comprising an escapement mechanism including a clock spring, an overload clutch, a drive shaft connected through said clutch to said mechanism, cam driven by said shaft and manually rotatable in both directions from an "off" position, one in the direction of winding the spring and the other in the direction of unwinding the spring, a cam follower cooperating with said cam, a switch actuator member, said follower being pivotally supported on said switch actuator member, said cam having a relieved portion defining a step thereon and said follower rotating in one direction to ride on the step when the cam is turned in one direction and slipping suddenly off of said step to a resting position when said cam is turned in the opposite direction, said clock spring being inoperative when said cam is manually rotated in said opposite direction from said resting position and a switch adapted to be closed when said spring is in said inoperative condition.

3. In a timer having a drive spring and an escapement mechanism, a friction clutch, a cam element movable in either direction from an "off" position having a sharp step thereon and connected to said spring and said mechanism through said clutch so as to return slowly to said "off" position when manually turned away from said position in one direction and released, said spring and mechanism being inoperative to move the cam when it is turned away from said position in the opposite direction, a switch adapted to be controlled by said cam element when said cam is turned in either direction from said position, means for actuating said switch including a moveable arm carrying a cam follower having a flat surface thereon, said cam follower being pivotally attached to said arm and moveable to either of two positions, and resilient means for urging said follower to one of said positions wherein the step is parallel to the flat surface, said resilient means being of such strength as to permit the follower to move to the other position wherein the flat surface makes an acute angle with respect to said step to ride up said step when the cam element is turned manually away from the "off" position.

4. In a timer having a drive spring and an escapement mechanism, a friction clutch, a cam element moveable in either direction from an "off" position having a sharp step and a gradual rise thereon and connected to said spring and said mechanism through said friction clutch so as to return slowly to said "off" position when manually turned away from said position and released, a switch adapted to be controlled by said cam element, means for actuating said switch including a moveable arm carrying a cam follower having a flat surface thereon, said cam follower being pivotally attached to said arm and moveable to either of two positions and resilient means for urging said follower to one of said positions wherein the step is parallel to the flat surface, said resilient means being of such strength as to permit the follower to move to the other position wherein the flat surface makes an acute angle with respect to said step to ride up said step when the cam element is turned manually away from the "off" position in one direction, the gradual rise permitting the cam to be turned in the opposite direction from the "off" position to close the switch and unwind the spring to an untensioned condition such as to render the escapement mechanism inoperative.

5. A timer comprising an escapement mechanism, drive means controlled by said escapement mechanism including a friction clutch, a manually-operable cam moveable in either direction from an "off" position connected to said drive means and having a relieved portion disposed between two raised portions, a follower urged to engage said cam, a switch operated by said follower when positioned by said cam on either side of said raised portions and relieved portion, said escapement mechanism being inoperative when said cam is moved in one direction, and being operative when said cam is moved in the opposite direction with respect to said follower from engagement with said relieved portion.

References Cited in the file of this patent
UNITED STATES PATENTS

| | | |
|---|---|---|
| 1,226,810 | Redfield et al. | May 22, 1917 |
| 2,056,400 | Holtz | Oct. 6, 1936 |
| 2,088,499 | Warner | July 27, 1937 |
| 2,230,191 | Knight | Jan. 28, 1941 |
| 2,480,760 | Morse | Aug. 30, 1949 |